United States Patent Office 2,753,380
Patented July 3, 1956

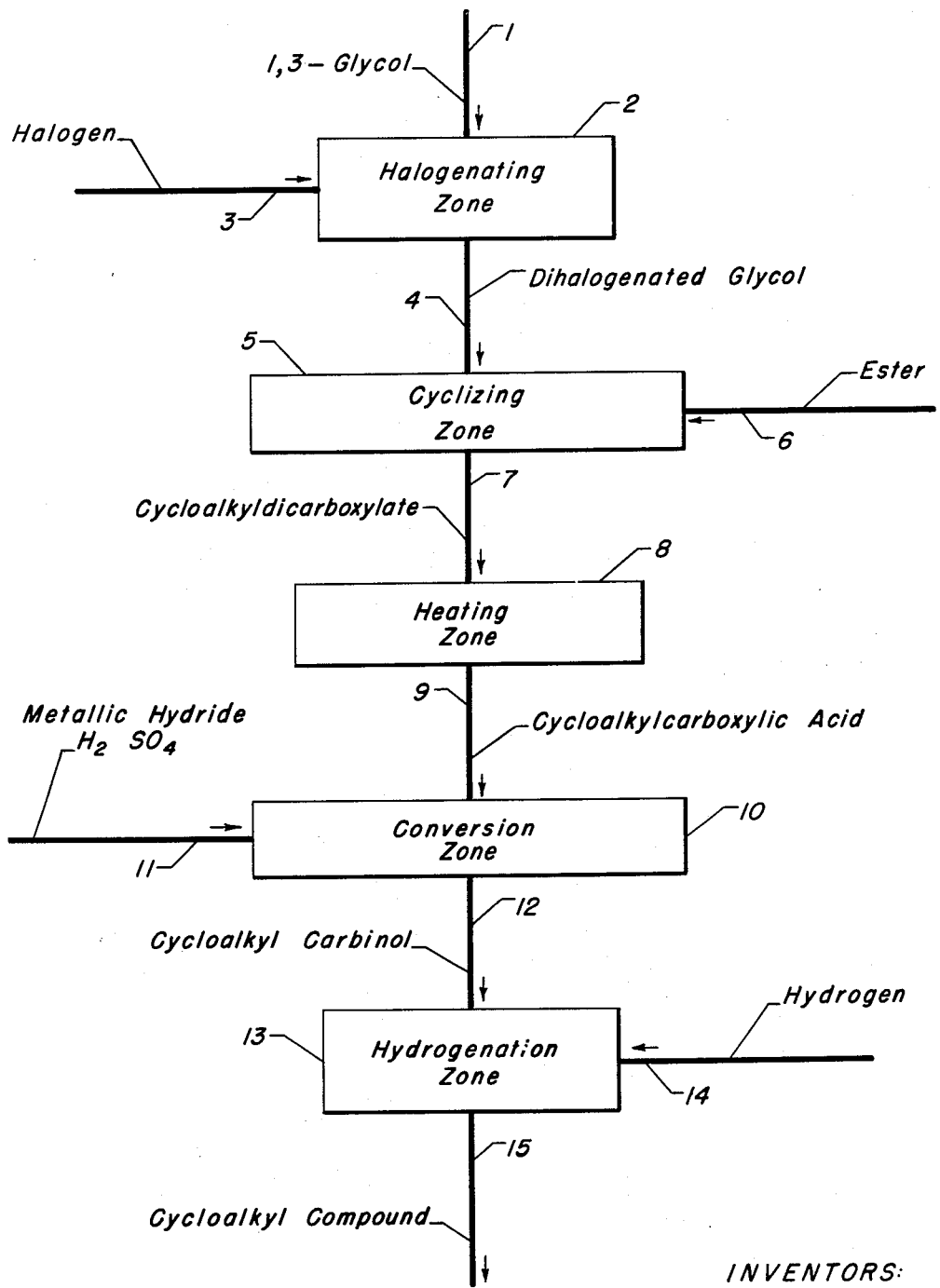

2,753,380

SYNTHESIS OF HYDROCARBONS

Herman Pines, Chicago, and Vladimir N. Ipatieff, deceased, late of Chicago, by Vladimir Haensel, Hinsdale, and Herman Pines, Chicago, and Vincetta Kibort, Chicago, Ill., executors, assignors to Universal Oil Products Company, Des Plaines, Ill., a corporation of Delaware Application May 4, 1953, Serial No. 353,006

12 Claims. (Cl. 260—666)

This invention relates to a novel method of synthesizing hydrocarbon containing a cyclobutyl ring.

In one embodiment our invention relates to a process for the synthesis of hydrocarbons containing a cyclobutyl ring which comprises the steps of halogenating a glycol, cyclizing the resultant compound to a cyclic dicarboxylic acid, removing one of said carboxylic acid groups, converting the remaining carboxylic acid group to a hydroxymethyl radical and dehydroxymethylating the resulting primary carbinol containing a cyclobutane ring.

In a more specific embodiment our invention comprises a process for the synthesis of hydrocarbons containing a cyclobutyl ring by a series of steps which consists of halogenating a 1,3-glycol, cyclizing the resultant compound by condensing it with malonic acid ester and saponifying it to a cyclic dicarboxylic acid, removing one of said carboxylic acid groups, converting the other carboxylic acid group to a hydroxymethyl group and dehydroxymethylating the resulting primary alcohol containing a cyclobutane ring.

In a still more specific embodiment our invention relates to a process for the synthesis of cyclobutane by a series of reactions which consist of brominating propylene glycol, condensing and cyclizing the resulting dibromopropane to a dialkyl-1,1-cyclobutyldicarboxylate by reaction with an ester of malonic acid, saponifying it and removing one of said carboxylic acid groups, converting the other carboxylic acid group to a hydroxymethyl group, and dehydroxymethylating the resultant cyclobutylmethanol to form cyclobutane by hydrogenolysis in the presence of a hydrogenation catalyst.

Other objects and embodiments of the invention referring to alternative reactants and catalysts which may be used within the scope of their invention will be referred to in greater detail in the following further description of the invention.

The invention is particularly applicable to the preparation of cyclobutanes. By the use of selected starting compounds, alkyl and cycloalkyl substituted hydrocarbons containing a cyclobutyl ring may also be produced according to this method.

It has heretofore been found that cyclic compounds containing less than 5 carbon atoms in the ring usually undergo a carbon to carbon cleavage of the ring upon hydrogenation at experimental conditions used for dehydroxymethylating. Therefore, cyclobutanes could not be subjected to hydrogenation at these conditions because of the carbon to carbon cleavage which would occur in the ring. However, in the process of the present invention we have found that it is now possible to hydrogenolyze a 4 carbon atom ring compound containing a hydroxymethyl group without rupturing the ring. It is believed that the presence of the hydroxymethyl group in the compound accounts for the difference in the observed results. Heretofore, the usual methods of preparing alkylcyclobutanes, and in particular, cyclobutane, have been difficult and the reported yields have been relatively low. One of the methods of the synthesis of cyclobutane found in the prior art proceeds according to the following steps: Pentaerythritol is brominated with phosphorous tribromide and then reacted in the presence of zinc to form methylene cyclobutane. The methylene cyclobutane is then oxidized to form cyclobutanone, after which the cyclobutanone is reduced by means of a Wolff-Kishner reaction to form cyclobutane.

The present invention relates to a more simple method for producing hydrocarbons containing a cyclobutyl ring and in particular, cyclobutane and alkyl or cycloalkyl substituted cyclobutanes, said method resulting in relatively greater yield of the various compounds produced by the intermediate steps and finally a relatively greater yield of the desired product. According to the present invention cyclobutane may be prepared in the following manner: A 1,3-glycol is halogenated to form the corresponding dihalogen compound. In the event that the end product of this process is to be substituted cyclobutane, alkyl or cycloalkyl substituted glycols, such as a propylene glycol having the general formula:

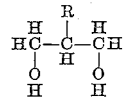

in which R may be an alkyl, cycloalkyl or a compound which, on dehydroxymethylation will form an alkyl or cycloalkyl substituent, are used as starting materials. Other glycols utilized in this process are 1,3-glycols which may include 1,3-butylene glycol, 1,3-amylene glycol, substituted 1,3, glycols such as 2-methyl-1,3-butylene glycol, 2-ethyl-1,3-butylene glycol, etc. If a cyclopentane or substituted cyclopentane is desired, a 1,4-glycol, such as 1,4-dihydroxy butylene is used, while if a 1,5-glycol is utilized the desired end product is a cyclohexane.

In this invention the preferred halogenating compound comprises phosphorous tribromide, although other halogen compounds such as the chlorides, or iodides of phosphorous may also be used. The resulting dihalogen compound is then reacted with an alkaline alkyl malonic ester to produce a dialkyl substituted cycloalkyldicarboxylate. The ester may be introduced as such or may be formed in situ. Disodium diethyl malonate is the organo-metallic ester used in the preferred embodiment of this invention. Calcium, barium, magnesium, strontium, potassium or lithium may also be used as the alkaline portion of this ester while the organo acidic salt may comprise a stearate, sebacate, etc. The resulting diethyl 1,1-cycloalkyldicarboxylate is reacted with an alcohol such as ethyl alcohol and an alkaline hydroxide such as potassium hydroxide, after which the alcohol is distilled off and an acid such as sulfuric acid is added to the solution. The solution then is extracted with an ether and dried over sodium sulfate. After distilling off the ether, the solution is heated to effect decarboxylation, thereby resulting in the formation of cycloalkylcarboxylic acid.

The cycloalkylcarboxylic acid is reduced with a metallic hydride, after which an alcohol or water is added to decompose the excess metallic hydride. The metallic hydride utilized in the present invention comprises lithium aluminum hydride although lithium, sodium, potassium, aluminum hydride, sodium aluminum hydride, potassium aluminum hydride, lithium borohydride or mixtures thereof may be used also. Sulfuric acid is then added to hydrolyze the complex and the resulting product, namely, cycloalkylmethanol, is recovered upon distillation of the solution.

The preferred method of obtaining the desired cycloalkyl or substituted cycloalkyl compound is to subject the cycloalkylcarbinol to hydrogenolysis by treating said product with hydrogen in the presence of a hydrogenation catalyst. However, other cycloalkyl or substituted cycloalkyl compounds such as aldehydes, which may form primary alcohols in situ, may also be subjected to hydrogenolysis in the same manner as hereinbefore set forth. Any suitable hydrogenation catalyst may be used for the present invention including nickel, platinum, palladium, cobalt, molybdenum, chromium, their oxides, or sulfides, etc. Other catalysts which may be used include Raney nickel or any active hydrogenation catalyst or mixture thereof which preferably is composited with a naturally occurring or synthetic carrier such as silica, kieselguhr, diatomaceous earth, or other inorganic oxides either alone or in combination. Mixed oxides such as copper-chromite may also be used as catalyst. It is to be noted that if the hydrogenating catalyst is used on a supporting material, the support should be one which would not cause a dehydration of the prepared alcohols prior to the dehydroxymethylation thereof. The preferred catalyst used in this invention comprises nickel composited with a naturally occurring carrier such as kieselguhr.

The dehydroxymethylation of the cycloalkylcarbinol may be effected in any suitable manner and may be either a batch or continuous type operation. When a batch type operation is used, a quantity of the cycloalkylcarbinol is placed in a reaction vessel equipped with a mixing device along with the particular catalyst which has been selected. Hydrogen is admitted to the vessel which is then heated to the desired temperature while the contents thereof are mixed. After a suitable time has elapsed, the reactor and its contents are cooled to room temperature, after which the desired product, namely, the cycloalkyl compound, is recovered by conventional means, for example, by fractional distillation.

Another method of operation of the present process is of the continuous type. A particularly suitable type of operation comprises a fixed bed type in which a catalyst such as a nickel-kieselguhr composite is disposed as a bed in the reaction zone, said zone being provided with hydrogen admitting means, and the cycloalkylcarbinol is passed therethrough in either an upward or downward flow in the presence of hydrogen. The cycloalkylcarbinol may be heated while in said zone or may be heated before admission thereto. The reaction product may be withdrawn and separated from the unreacted starting material by fractional distillation or otherwise, after which the unreacted cycloalkylcarbinol may be recycled and used as a portion of the feed stock.

Another continuous type process is the fluidized type of operation in which the cycloalkylcarbinol and catalyst are maintained in a state of turbulence under hindered settling conditions in the reaction zone while hydrogen is being admitted thereto. Other continuous type processes include the compact moving bed type of operation in which the cycloalkylcarbinol and the catalyst pass either concurrently or countercurrently to each other in an atmosphere of hydrogen and the slurry type operation in which the catalyst is carried into the reaction zone as a slurry in the cycloalkylcarbinol.

The reactions of the present invention will be effected under suitable operating conditions, which conditions will depend upon the particular reactions and catalysts employed. For example, the halogenation of propylene glycol with $PBr_3$ may be effected at temperatures ranging from about 50° C. to about 150° C., although higher or lower temperatures also may be used.

The particular temperature under which the dehydroxymethylation reaction of the present invention occurs varies greatly and is dependent upon many factors which are involved in said reaction, among which are the type of the carbinol undergoing dehydroxymethylation, the activity of the particular catalyst used in the reaction, the experimental conditions employed such as pressure, ratio of hydrogen to the carbinol, etc. Temperatures which are utilizable in the dehydroxymethylation step may vary over a wide range of from about atmospheric to about 300° C., although temperatures below 200° C. are preferred.

For purposes of showing the preparation of the desired compound diagrammatically, reference may be made to the accompanying drawing, which is a simplified flow sheet showing one embodiment of the invention in which a 1,3-glycol passes through line 1 into a halogenating zone 2 where it is halogenated by means of reaction with a halogenating agent introduced through line 3. The dihalogenated glycol passes through line 4 into a cyclizing zone 5 where said glycol is cyclized by reaction with an alkaline alkyl malonic ester introduced through line 6. The cycloalkyldicarboxylate is withdrawn through line 7 to a heating zone 8 where said dicarboxylate is heated to effect decarboxylation, thereby forming a cycloalkylcarboxylic acid. The acid is led through line 9 to a conversion zone 10 where the acid is converted to a cycloalkyl carbinol by reduction in the presence of a metallic hydride and hydrolysis with sulfuric acid, the latter compounds being introduced into conversion zone 10 through line 11. The cycloalkyl carbinol is then led through line 12 to a hydrogenation zone 13 where said carbinol is hydrogenated by treatment with hydrogen, introduced through line 14, in the presence of a hydrogenation catalyst. The desired product, comprising the cycloalkyl compound, is then withdrawn from the hydrogenation zone through line 15 to a separation and purification zone not shown in the drawings.

The present invention is further illustrated with respect to specific embodiments thereof in the following example, which, however, is not intended to limit the generally broad scope of the present invention in strict accordance therewith.

*Example I*

600 grams of propylene glycol were reacted with 450 grams of phosphorous tribromide in a suitable vessel at 100° C. for a period of 3 hours, after which time the 1,3-dibromopropane was separated by fractional distillation. A mixture of 471 grams of 1,3-dibromopropane and 373 grams of diethyl malonate was placed in a flask fitted with a condenser. 107 grams of newly cut sodium dissolved in two liters of absolute ethyl alcohol was introduced into the 1,3-dibromopropane and diethyl malonate mixture at such a rate as to boil the solution. After all of the sodium ethoxide had been added the mixture was refluxed for a period of 3 hours. The alcohol was distilled off, and after the residue had cooled, 650 ml. of water were added to dissolve the sodium bromide. The aqueous layer was separated from the organic layer and the former was extracted 3 times with 150 ml. of ethyl ether to remove all of the desired product retained by the aqueous layer. The organic layer and the ethyl ether extracts were combined, and the resulting solution dried over sodium sulfate. The ether was distilled off and the remaining residue fractionally distilled under reduced pressure. The distillate consisting of diethyl 1,1-cyclobutyldicarboxylate, boiling from 101°–103° C., was recovered.

The diethyl 1,1-cyclobutyldicarboxylate was placed in a flask equipped with a condenser along with a solution of 124 ml. of ethyl alcohol, 192 grams of potassium hydroxide and 290 ml. of water. After all of the reactants had been added, stirring and heating were continued for a period of 3 hours, after which time the alcohol was distilled off and the aqueous solution permitted to cool. 103 ml. of concentrated sulfuric acid and 172 ml. of water were added to the solution, after which the solution was extracted twice with 250 ml. of ethyl ether, five times with 80 ml. of ethyl ether and twice with 40 ml. of ethyl ether. The nine other extracts were combined and dried over sodium sulfate, after which the ether was distilled off and the residue heated above its melting point, thereby causing decarboxylation to form cyclobutancarboxylic acid.

A slurry of 9.2 grams of lithium aluminum hydride in 350 ml. of anhydrous ether was added to a three necked flask fitted with a condenser, dropping funnel and calcium chloride drying tube. A solution of 27 grams of cyclobutane carboxylic acid in 400 ml. of anhydrous ethyl ether was then added to the flask at such a rate as to produce a gentle refluxing action. Stirring was continued for 15 minutes after the solution of the cyclobutane carboxylic acid in the ethyl ether had been added. Water was added to decompose the excess lithium aluminum hydride, and 400 ml. of a 10% sulfuric acid solution was added to hydrolyze the complex. The resultant aqueous layer was then separated from the ether layer and the former was extracted four times with 100 ml. of ether. The four ether extraction portions and the first ether portion were then combined and dried over sodium sulfate. The ether was distilled off and the residue subjected to fractional distillation. The portion of the distillate boiling from 142–143.5° C. was recovered, said distillate consisting of cyclobutylmethanol.

25 grams of the cyclobutylmethanol and 2.5 grams of a nickel-kieselguhr catalyst were placed in a stainless steel rotating autoclave. The autoclave was charged with hydrogen at a pressure of 100 atmospheres and heated to a temperature of 154° C. The reaction was allowed to continue for a period of 5 hours, after which the autoclave was cooled and the cyclobutane product recovered by means of a Dry Ice-acetone cooled receiver. The liquid was filtered to remove the catalyst and then dried.

We claim as our invention:

1. A method for the preparation of a hydrocarbon containing a cyclobutyl ring which comprises the steps of halogenating a glycol, cyclizing the resultant halogenated compound to a cyclic dicarboxylic acid, removing one of said carboxylic acid groups, converting the remaining carboxylic acid group to a hydroxymethyl group, and dehydroxymethylating the resulting cycloparaffin carbinol by reduction with hydrogen.

2. A method for the preparation of a hydrocarbon containing a cyclobutyl ring which comprises the steps of halogenating a 1,3-glycol, cyclizing the resultant halogenated compound to a cyclic dicarboxylic acid, removing one of said carboxylic acid groups, converting the remaining carboxylic acid group to a hydroxymethyl group, and dehydroxymethylating the resulting alcohol containing a cyclobutyl ring by reduction with hydrogen.

3. A method for the preparation of a substituted cyclobutane which comprises the steps of halogenating 1,3-glycol, cyclizing the resultant halogenated compound to a substituted dicarboxylic acid, removing one of said carboxylic acid groups, converting the remaining carboxylic acid group to a hydroxymethyl group and dehydroxymethylating the resulting carbinol by reduction with hydrogen.

4. A method for the preparation of cyclobutane which comprises the step of brominating propylene glycol, cyclizing the resultant dibromopropane to a dialkyl ester of 1,1-cyclobutyldicarboxylic acid by reaction with a malonic acid ester in the presence of alkali, removing one of said carboxylic acid groups, converting the remaining carboxylic acid group to a hydroxymethyl group in the presence of a metallic hydride, and dehydroxymethylating the resulting cyclobutylmethanol by reduction with hydrogen in the presence of a solid hydrogenation catalyst.

5. A method for the preparation of cyclobutane which comprises the steps of brominating propylene glycol, cyclizing the resultant dibromopropane to a diethyl-1,1-cyclobutyldicarboxylate by reduction with disodium malonic diethyl ester, removing one of said carboxylic acid groups, converting the remaining carboxylic acid group to a hydroxymethyl group, and dehydroxymethylating the resulting cyclobutylmethanol by reduction with hydrogen in the presence of a solid hydrogenation catalyst.

6. A method for the preparation of cyclobutane which comprises the steps of brominating propylene glycol, cyclizing the resultant dibromopropane to a diethyl-1,1-cyclobutyldicarboxylate by reaction with disodium malonic diethyl ester, removing one of said carboxylic acid groups by means of heat, converting the remaining carboxylic acid group to a hydroxymethyl group in the presence of a metallic hydride, and dehydroxymethylating the resulting cyclobutylmethanol by reduction with hydrogen in the presence of a solid hydrogenation catalyst.

7. A method for the preparation of cyclobutane which comprises the steps of brominating propylene glycol, cyclizing the resultant dibromopropane to diethyl-1,1-cyclobutyldicarboxylate by reaction with disodium malonic diethyl ester, removing one of said carboxylic acid groups by means of heat, converting the remaining carboxylic acid group to a hydroxylmethyl group by the use of lithium aluminum hydride, and dehydroxymethylating the resulting cyclobutylmethanol by reduction with hydrogen in the presence of a solid hydrogenation catalyst.

8. A method for the preparation of cyclobutane which comprises the steps of brominating propylene glycol, cyclizing the resultant dibromopropane to diethyl-1,1-cyclobutyldicarboxylic acid by reaction with an organometallic ester, removing one of said carboxylic acid groups; converting the remaining carboxylic acid group to a hydroxymethyl group in the presence of lithium aluminum hydride, and dehydroxymethylating the resultant cyclobutylmethanol by reduction with hydrogen in the presence of a nickel-kieselguhr hydrogenation catalyst.

9. A method for the preparation of cyclobutane which comprises the steps of brominating propylene glycol, cyclizing the resultant dibromopropane to diethyl-1,1-cyclobutyldicarboxylate by reaction with disodium malonic diethyl ester, removing one of said carboxylic acid groups, converting the remaining carboxylic acid group to a hydroxymethyl group in the presence of a metallic hydride, and dehydroxymethylating the resulting cyclobutylmethanol by reduction with hydrogen in the presence of a chromite hydrogenation catalyst.

10. A method for the preparation of a hydrocarbon containing a cyclobutyl ring which comprises the step of dehydroxymethylating a primary alcohol containing a cyclobutane ring by reducing said alcohol with hydrogen in the presence of a solid hydrogenation catalyst.

11. A method for the preparation of cyclobutane which comprises the step of dehydroxymethylating a primary alcohol containing a cyclobutane ring by reducing said alcohol with hydrogen in the presence of a solid hydrogenation catalyst.

12. A method for the preparation of cyclobutane which comprises the step of dehydroxymethylating a primary alcohol containing a cyclobutane ring by reducing said alcohol with hydrogen in the presence of a nickel-kieselguhr hydrogenation catalyst.

References Cited in the file of this patent

Organic Reactions, by Roger Adams et al., vol. VI, John Wiley and Sons, New York (1951), p. 478.

Lithium Aluminum Hydride Bulletin 401 A, Metal Hydrides Inc., Beverly, Mass. Received June 27, 1951.

Catalytic Reactions at High Pressure and Temperatures, by V. Ipatieff, The MacMillan Co., New York (1936), pp. 173 and 174.

A Textbook of Organic Chemistry, by Bernthsen, D. V. Nostrand Co. (1912), pp. 176 and 177.

Richter's Organic Chemistry, vol. II, Taylor, Nordeman Pub. Co., N. Y. (1939), pp. 38 and 39.

Organic Chemistry, by Paul Karrer, Elsevier Pub. Co., N. Y. (1947), p. 234.